United States Patent
Yang et al.

(10) Patent No.: US 6,881,052 B2
(45) Date of Patent: Apr. 19, 2005

(54) DEVICE AND METHOD FOR HEATING HYDROGEN STORAGE CANISTER

(75) Inventors: Jefferson Y S Yang, Orange, CA (US); Yingjeng James Li, Taoyuan Hsien (TW)

(73) Assignee: Asia Pacific Fuel Cell Technologies, Ltd., Miaoli (TW)

( * ) Notice: Subject to any disclaimer, the term of this patent is extended or adjusted under 35 U.S.C. 154(b) by 0 days.

(21) Appl. No.: 10/735,755

(22) Filed: Dec. 16, 2003

(65) Prior Publication Data

US 2004/0142291 A1 Jul. 22, 2004

(30) Foreign Application Priority Data

Jan. 21, 2003 (TW) ........................................ 92101193 A

(51) Int. Cl.⁷ .............................................. F17C 11/00
(52) U.S. Cl. .............................. 431/6; 431/7; 431/170; 431/268; 431/328; 431/350; 431/354; 422/212; 48/61
(58) Field of Search .............................. 431/6, 7, 170, 431/268, 328, 350, 354; 422/129, 198, 212; 48/61

(56) References Cited

U.S. PATENT DOCUMENTS

| 4,085,590 A | * | 4/1978 | Powell et al. ................. 60/673 |
|---|---|---|---|
| 4,285,665 A | * | 8/1981 | Enga ........................ 431/328 |
| 4,290,267 A | * | 9/1981 | Buchner ...................... 60/648 |
| 4,566,281 A | * | 1/1986 | Sandrock et al. ............ 62/46.3 |
| 4,570,446 A | * | 2/1986 | Matsubara et al. .......... 62/46.2 |
| 4,850,859 A | * | 7/1989 | Kesten et al. ............... 431/328 |
| 6,099,811 A | * | 8/2000 | Stetson et al. .............. 422/212 |
| 6,302,683 B1 | * | 10/2001 | Vestin et al. ................... 431/7 |
| 6,530,233 B1 | * | 3/2003 | Nakamura et al. ........... 62/46.2 |
| 6,630,648 B1 | * | 10/2003 | Gruenwald ................. 219/385 |
| 2003/0167923 A1 | * | 9/2003 | Grote et al. .................. 96/108 |
| 2003/0209149 A1 | * | 11/2003 | Myasnikov et al. .......... 96/146 |
| 2003/0215684 A1 | * | 11/2003 | Yang et al. .................... 429/26 |

FOREIGN PATENT DOCUMENTS

| FR | 2379704 A | * | 10/1978 | .......... F01K/17/00 |
|---|---|---|---|---|
| JP | 2002252015 A | * | 9/2002 | .......... H01M/8/04 |
| JP | 2002277093 A | * | 9/2002 | .......... F25B/17/12 |
| JP | 2002277094 A | * | 9/2002 | .......... F25B/17/12 |

* cited by examiner

Primary Examiner—Ira S Lazarus
Assistant Examiner—James G. Barrow
(74) Attorney, Agent, or Firm—Rosenberg, Klein & Lee

(57) ABSTRACT

A device for heating hydrogen storage canister includes a canister containing chamber for accommodation of at least one hydrogen storage canister, a catalyst bed arranged in the canister containing chamber for catalysis. A blowing device provides an air flow through an air flow leading pipe to a nozzle section which is connected with a heating gas drawing pipe to the catalyst bed. A heating fuel storage tank supplies heating fuel which is conveyed to the nozzle section through a heating fuel supplying pipeline, a coiled pipe and a heating fuel conveying pipe in sequence. When the air flow flows through the nozzle section, the heating fuel is drawn into the nozzle section to mix with the air flow, forming a heating gas. The heating gas is atomized by the nozzle section and flows to the catalyst bed where the heating gas is catalyzed to burn to generate a hot gas to heat the hydrogen storage canister.

15 Claims, 2 Drawing Sheets

DEVICE AND METHOD FOR HEATING HYDROGEN STORAGE CANISTER

BACKGROUND OF THE INVENTION

1. Field of the Invention

The present invention relates generally to a heating technique of hydrogen storage canister, and in particular to a method for heating up hydrogen storage canister to discharge hydrogen. The present invention also relates to a device for performing the method.

2. Description of the Prior Art

A fuel cell system is a power-generating unit that generates electrical power energy through electrochemical reaction of hydrogen and oxygen. To perform electrochemical reaction, hydrogen gas and air are separately conveyed to the fuel cell system via hydrogen gas passage and air passage.

Currently, a variety of ways are available for storage of hydrogen. Hydrogen can be stored in compressed gas form as compressing hydrogen, in liquid state as liquid hydrogen or in hydride form as metal hydride. Although a compressing hydrogen increases the gravimetric density of hydrogen, compressing hydrogen is an expensive process and the compressed hydrogen gas still occupies a great amount of space. In addition, the high pressure of compressed hydrogen is adverse to operation safety. Similarly, liquid hydrogen has high density. However, liquidization of hydrogen is a high energy consumption process. Moreover, because liquid hydrogen must be stored in a heat insulating storage tank, it is more economical and suitable to use liquid hydrogen in a system with a large storage tank. In most applications, hydride form is the most feasible way for storing hydrogen economically. An example is the compact hydrogen storage of electrical vehicle.

Metal hydride is formed by metallic material commonly referred to as hydrogen storage alloy which is capable to adsorb and desorb hydrogen. There are a variety of metal hydrides available. The charging/discharging pressure and temperature depend on the kind of metal hydride used. Also, the hydrogen storage capacity of metal hydride, i.e. the weight or volume of hydrogen that a unit weight of metal hydride can adsorb, varies from kind to kind. The conventional metal hydrides include lanthanum-nickel alloy (LaNi), iron-titanium alloy (FeTi) and magnesium (Mg) alloy, among which iron-titanium alloy is most commonly used. Some properties of iron-titanium alloy, including the hydrogen pressure, hydrogen flux and unit weight, make the iron-titanium alloy comparatively more suitable to be used in, for example, electrical vehicle than others.

The hydrogen storage capacity of magnesium alloy is larger than that of lanthanum-nickel alloy or iron-titanium alloy. In other words, for the same unit weight of alloy, magnesium alloy can store a larger amount of hydrogen than lanthanum-nickel alloy or iron-titanium alloy. However, magnesium alloy possesses a defect in practical use. Magnesium alloy is able to release a high flux of hydrogen only when the temperature is high enough e.g. at 200~300° C. Therefore, it is not appropriate and inefficient to use magnesium alloy in a system that does not comprise a powerful heating device to heat up the magnesium alloy.

Generally, it is convenient and safe to use hydrogen storage alloy for storage of hydrogen in a fuel cell system. However, it should be noted that the ability of the hydrogen storage alloy to charge and discharge hydrogen directly affects the performance of the fuel cell system. Desorption of hydrogen is an endothermic process, and therefore, during discharging, the hydrogen storage alloy absorbs heat and causes a drop in temperature. The decrease of temperature in turn slows down the release of hydrogen from the hydrogen storage alloy. Therefore, to maintain a steady discharging rate or to speed up the discharging of hydrogen at high performance, it is required to properly heat up the hydrogen storage alloy.

The conventional techniques for heating up the hydrogen storage alloy to discharge hydrogen include heating by an electrical heater or by the heat waste recirculated from the engine or the fuel cell system. In that cases, the fuel cell system is either equipped with a power supply for powering the electrical heater, or alternatively, with a heat waste recirculator for utilizing of the heat waste. Both of the techniques are limited to use in some applications. Practically, the use of the electrical heater consumes a substantial amount of power and raises the operation cost. Besides, the heating rate is not fast enough. The heating devices currently available are not capable to heat up rapidly to a high temperature. On the other hand, the temperature of the heat waste from the proton exchange membrane fuel cell system is usually below 100° C. which is not hot enough for heating up the magnesium alloy based hydrogen storage alloy.

SUMMARY OF THE INVENTION

Thus, a primary object of the present invention is to provide a heating device for heating hydrogen storage canisters made of metal hydride, such that the hydrogen storage canisters are rapidly heated up to release hydrogen at discharging.

Another object of the present invention is to provide a device for providing heat to hydrogen storage canisters by burning a heating fuel. The technique can be applied in various fields and in particularly when heating by conventional ways e.g. electrical heater is not applicable.

A further object of the present invention is to provide a high performance heating device for heating hydrogen storage canisters. The heating device generates heat rapidly by catalyzing the combustion of methanol in a catalyst bed, such that the hydrogen storage canisters contained in a canister containing chamber can be heated efficiently in short time.

A yet further object of the present invention is to provide a method for heating hydrogen storage canisters. Air and methanol are conveyed smoothly and mixed efficiently, and combusted to produce sufficient heat to raise the temperature of the hydrogen storage canisters within a short time.

To achieve the above objects, in accordance with the present invention, there is provided a device and method for heating hydrogen storage canister. The device includes a canister containing chamber for accommodation of at least one hydrogen storage canister, a catalyst bed arranged in the canister containing chamber for catalysis, a blowing device for providing an air flow through an air flow leading pipe to a nozzle section which is connected with a heating gas drawing pipe to the catalyst bed, and a heating fuel storage tank for storage of a heating fuel which is conveyed to the nozzle section through a heating fuel supplying pipeline, a coiled pipe and a heating fuel supplying conduit in sequence. When air flow flows through the nozzle section, the heating fuel is drawn into the nozzle section to mix with the air flow, forming the heating gas. The heating gas is atomized by the nozzle section and flows to the catalyst bed where the heating gas is catalyzed to burn to generate a hot gas to heat the hydrogen storage canister.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE PREFERRED EMBODIMENT

Figure 1:
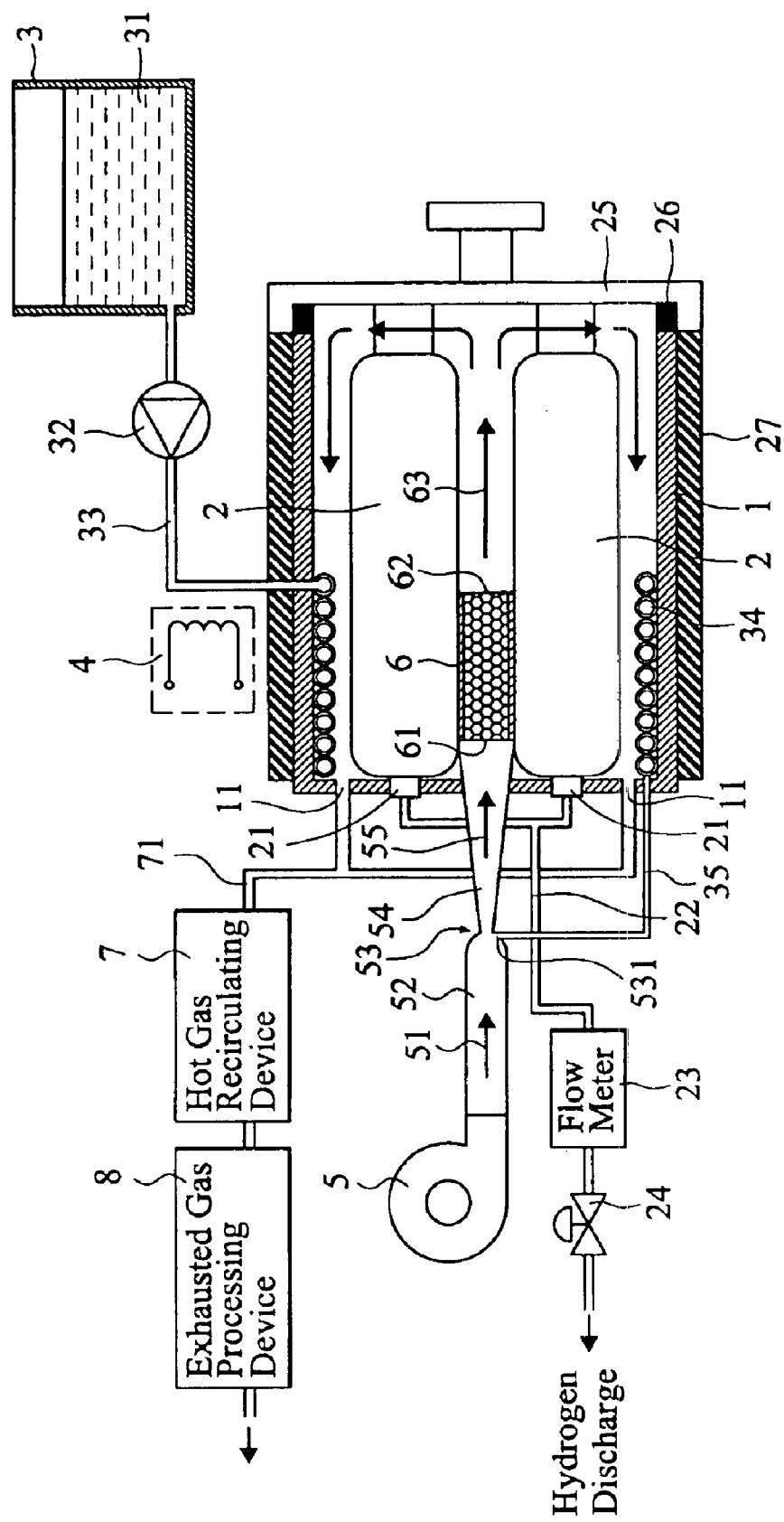
FIG. 1 is a schematic view showing an arrangement of the components of a device for heating hydrogen storage canisters in accordance with a preferred embodiment of the present invention.

With reference to the drawings and in particular to FIG. 1, a device for heating hydrogen storage canisters in accordance with a preferred embodiment of the present invention is shown. The heating device comprises a canister containing chamber 1 that is formed with an internal space for accommodation of e.g. two hydrogen storage canisters 2 therein. Each hydrogen storage canister 2 is coupled to one end of a hydrogen supplying pipeline 22 by means of a connecting member 21. The connecting member 21 secures the connection between the hydrogen storage canister 2 and the hydrogen supplying pipeline 22 by means of conventional linkage such as engagement, fastening, screwing or pressing.

The hydrogen supplying pipeline 22 comprises a flow meter 23 for measuring a flow rate of hydrogen flowing from the hydrogen storage canisters 2, and a pressure regulating valve 24 for regulating the pressure of hydrogen released from the hydrogen supplying pipeline 22.

The other end of the canister containing chamber 1 is covered by a cover 25 to form a closed end. When hydrogen in the hydrogen storage canister 2 is used up, the cover 25 is removed such that the hydrogen storage canister 2 can be dismounted and taken out from the canister containing chamber 1, and replaced with a new hydrogen storage canister 2. A packing ring 26 is sandwiched between the cover 25 and the canister containing chamber 1. Moreover, a heat insulating layer 27 may be formed on the outer surface of the canister containing chamber 1 to keep the temperature of the canister containing chamber 1.

The heating device also comprises a heating fuel storage tank 3 for storage of a heating fuel 31 such as methanol. The heating fuel 31 is supplied to a heating fuel supplying pipeline 33 by a pump 32. A coiled pipe 34 winds around an inner surface of the canister containing chamber 1. One end of the coiled pipe 34 is connected to the heating fuel supplying pipeline 33 for conveying the heating fuel 31 therefrom.

Preferably, the heating fuel supplying pipeline 33 is equipped with a pre-heating device 4 at a section preceding the canister containing chamber 1. The pre-heating device 4 may be an electrical heater. By means of the pre-heating device 4, the heating fuel 31 supplied by the heating fuel storage tank 3 is pre-heated when it flows through the heating fuel supplying pipeline 33 to the coiled pipe 34.

Also, the heating device 1 comprises a blowing device 5 for supplying an air flow 51. An outflow end of the blowing device 5 is connected to an inflow end of a nozzle section 53 via an air flow leading pipe 52 to convey the air flow 51 to the nozzle section 53. Then, the air flow 51 sprays out from an outflow end of the nozzle section 53 to a heating gas drawing pipe 54 which is communicated with a heating gas inflow end 61 of a catalyst bed 6. The catalyst bed 6 is arranged in the internal space of the canister containing chamber 1. In the embodiment, the catalyst bed 6 is disposed between two hydrogen storage canisters 2.

The nozzle section 53 is also connected with a heating fuel inlet 531 which is communicated with a heating fuel supplying conduit 35. The heating fuel supplying conduit 35 is connected with the coiled pipe 34 connecting to the heating fuel pipeline 33.

Because the dimension of the passage of the nozzle section 53 is smaller than that of the air flow leading pipe 52, when air flow 51 flows from the air flow leading pipe 52 to the nozzle section, it has a pressure drop at the nozzle section 53. Thereby, the heating fuel 31 in the heating fuel supplying conduit 35 is sucked to the nozzle section 53. Subsequently, the heating fuel 31 is mixed with the air flow and atomized to form a heating gas 55.

The heating gas 55 is conveyed through the heating gas drawing pipe 54 to the heating gas inflow end 61 of the catalyst bed 6. The heating gas 55, which comprises the heating fuel and air, is catalyzed by the catalyst bed 6 to combust and generate a hot gas 63 that flows around the internal space of the canister containing chamber 1. The canister containing chamber 1 is provided with at least one through hole 11 serving as a hot gas guiding outlet for the hot gas 63. Thereby, the hydrogen storage canisters 2 contained in the canister containing chamber 1 is heated. Moreover, when the hot gas 63 flows through the gap between the hydrogen storage canisters 2 and the inner surface of the canister containing chamber 1, it heats up the heating fuel 31 in the coiled pipe 34. Accordingly, the heating fuel 31 such as methanol is completely vaporized in the coiled pipe 34.

The canister containing chamber 1 may comprise a hot gas recirculating device 7 connected to the through hole 11 of the canister containing chamber 1 via a hot gas recirculating pipeline 71 for reuse of hot gas that may be incompletely burnt or for utilization of heat waste. The heat waste may also be further processed to remove the incompletely burnt substances thereof.

Moreover, the canister containing chamber 1 may further comprise an exhausted gas processing device 8 for processing the hot gas from the hot gas recirculating device and removing the incompletely burnt substances that contain in the hot gas. The exhausted gas processing device is similar to the catalyst converter of a vehicle and able to reduce pollution.

Figure 2:
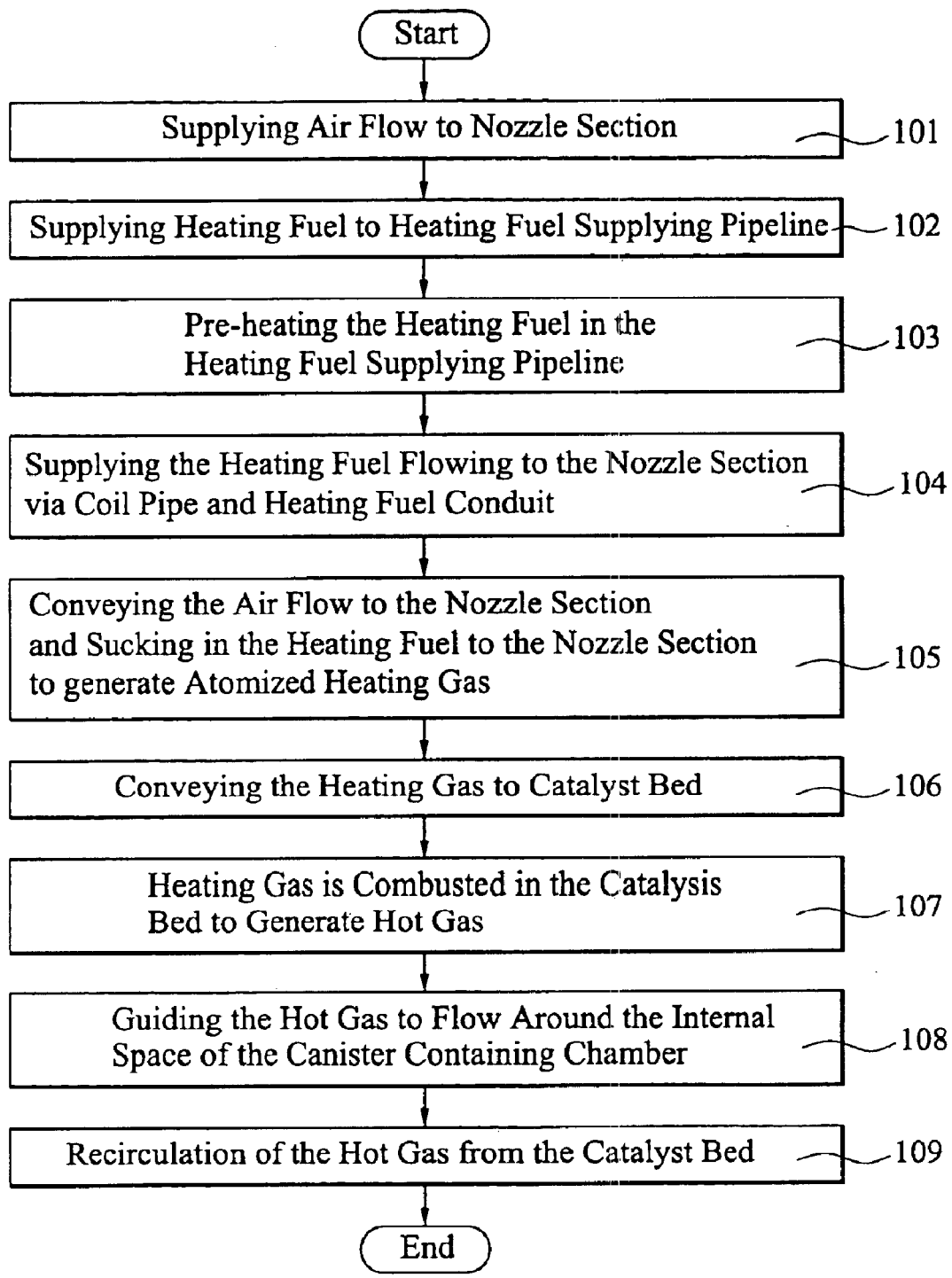
FIG. 2 is a flowchart showing a method of heating hydrogen storage canister in accordance with the present invention.

Please refer to FIG. 2 which is a flowchart showing a method of heating hydrogen storage canister 2 based on the above-mentioned arrangement. Firstly, air is drawn in by the blowing device 5 to generate an air flow 51 which is conveyed to the nozzle section 53 via the air flow leading pipe 52 in step 101. Meanwhile, the pump 32 draws the heating fuel 31 such as methanol in the heating fuel storage tank 3 into the heating fuel supplying pipeline 33 in step 102. In step 103, the heating fuel 31 in the heating fuel supplying pipeline 33 is pre-heated by the pre-heating device 4.

Then, the heating fuel 31 flows through the coiled pipe 34 and the heating fuel supplying conduit 35 to the heating fuel inlet 531 in step 104. When flowing through the coiled pipe 34, the heating fuel 31 is heated by the hot gas 63 generated by the catalyst bed 6 in the canister containing chamber 1 and vaporized.

In step 105, the air flow 51 flows through the nozzle section 53 and draws in the heating fuel 31 from the heating fuel inlet 531. The air flow 51 is mixed with the heating fuel 31 and atomized by the nozzle section 53 to form a heating gas 55. In step 106, the heating gas 55 is conveyed to the catalyst bed 6. Catalyzed by the catalyst bed 6, the heating gas 55 is combusted in the catalyst bed 6 to generate a hot gas 63 in step 107.

Subsequently, the hot gas 63 flows around the internal space of the canister containing chamber 1 and heats up the hydrogen storage canisters 2 in step 108. Finally, the hot gas is exhausted and re-circulated in step 109.

From the described embodiment, it is noted that the device and method for heating the hydrogen storage canisters are novel and very practical. Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A device for heating at least one hydrogen storage canister to discharge hydrogen, comprising:
   a canister containing chamber with an inner space for accommodating the hydrogen storage canister therein;
   a catalyst bed, arranged in the inner space of the canister containing chamber, having a heating gas inflow end and a heating gas outflow end;
   a blowing device, for providing an air flow into an air flow leading pipe;
   a nozzle section, which has an inflow end in communication with the air flow leading pipe for conveying the air flow into the nozzle section and an outflow end in communication with a heating gas drawing pipe connecting to the heating gas inflow end of the catalyst bed;
   a heating fuel storage tank for supplying a heating fuel via a heating fuel supplying pipeline to the nozzle section;
   wherein when the air flow flows through the nozzle section, the heating fuel in the heating fuel supplying pipeline is sucked into the nozzle section to mix with the air flow forming an atomized heating gas, the atomized heating gas being further supplied into the catalyst bed via the heating gas drawing pipe to generate a hot gas, so that the hydrogen storage canister contained in the canister containing chamber is heated to discharge hydrogen into a hydrogen supplying pipeline.

2. The device as claimed in claim 1, wherein the heating fuel is methanol.

3. The device as claimed in claim 1, wherein the heating fuel supplying pipeline is further equipped with a pre-heating device for pre-heating the heating fuel in the fuel supplying pipeline before supplying to the nozzle section.

4. The device as claimed in claim 1, wherein the canister containing chamber is further provided with a coiled pipe around an inner surface of the canister containing chamber, the coiled pipe being connected between the heating fuel supplying pipeline and the nozzle section for conveying the heating fuel from the heating fuel supplying pipeline to the nozzle section, when flowing through the coiled pipe, the heating fuel being heated by the hot gas generated in the catalyst bed.

5. The device as claimed in claim 1, wherein the canister containing chamber is further equipped with a heat insulating layer surrounding an outer surface of the canister containing chamber.

6. The device as claimed in claim 1, wherein the hydrogen supplying pipeline comprises a pressure regulating valve for regulating a pressure of the discharged hydrogen.

7. The device as claimed in claim 1, wherein the hydrogen supplying pipeline comprises a flow meter for measuring a flow rate of the discharged hydrogen.

8. The device as claimed in claim 1, wherein in the canister containing chamber comprises at least one through hole serving as a hot gas guiding outlet for the hot gas.

9. The device as claimed in claim 8, further comprising a hot gas recirculating device connected to the through hole of the canister containing chamber via a hot gas recirculating pipeline for reuse of the hot gas.

10. A method for heating at least one hydrogen storage canister accommodated in a canister containing chamber to discharge hydrogen of the hydrogen storage canister, comprising:
    (a) supplying an air flow to a nozzle section via an air flow leading pipe;
    (b) supplying a heating fuel to a heating fuel supplying pipeline and then conveying the heating fuel from the heating fuel supplying pipeline to the nozzle section;
    (c) sucking the heating fuel from the heating fuel supplying pipeline into the nozzle section to form an atomized heating gas when the air flow flows through the nozzle section;
    (d) conveying the atomized heating gas to the catalyst bed which catalyzes the heating gas to combust and generate a hot gas; and
    (e) conveying the hot gas into the canister containing chamber to heat up the hydrogen storage canister.

11. The method as claimed in claim 10, wherein the heating fuel is methanol.

12. The method as claimed in claim 10, wherein step (b) further comprises a step of pre-heating the heating fuel in the heating fuel supplying pipeline.

13. The method as claimed in claim 10, wherein in step (b), the heating fuel supplied to the heating fuel supplying pipeline is further conveyed to a coiled pipe around an inner surface of the canister containing chamber before conveying to the heating fuel supplying conduit, such that the heating fuel is heated by the hot gas generated by the catalyst bed when flowing through the coiled pipe.

14. The method as claimed in claim 10, wherein step (d) further comprises a step of recirculation of the hot gas generated by the catalyst bed.

15. The method as claimed in claim 10, wherein step (d) further comprises a step of processing the hot gas to remove incompletely burnt substances from the catalyst bed.

\* \* \* \* \*